United States Patent
Gyoten (10) Patent No.: US 9,507,246 B2
(45) Date of Patent: Nov. 29, 2016

(54) SEMICONDUCTOR LIGHT SOURCE DRIVING APPARATUS AND A PROJECTION TYPE DISPLAY APPARATUS

(71) Applicant: Panasonic Corporation, Kadoma-shi, Osaka (JP)

(72) Inventor: Takaaki Gyoten, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 197 days.

(21) Appl. No.: 14/306,950

(22) Filed: Jun. 17, 2014

(65) Prior Publication Data

US 2014/0368798 A1 Dec. 18, 2014

(30) Foreign Application Priority Data

Jun. 18, 2013 (JP) ................................. 2013-127256
Jun. 4, 2014 (JP) ................................. 2014-115880

(51) Int. Cl.
| H05B 37/02 | (2006.01) |
| G03B 21/20 | (2006.01) |
| H05B 33/08 | (2006.01) |
| H05B 37/03 | (2006.01) |
| G03B 33/06 | (2006.01) |

(52) U.S. Cl.
CPC ......... *G03B 21/2053* (2013.01); *G03B 21/204* (2013.01); *H05B 33/083* (2013.01); *H05B 33/0893* (2013.01); *H05B 37/036* (2013.01); *G03B 33/06* (2013.01)

(58) Field of Classification Search
USPC ........ 315/185 R, 209 R, 210, 291, 294, 299, 315/308
See application file for complete search history.

(56) References Cited

U.S. PATENT DOCUMENTS

| 7,425,943 | B2 | 9/2008 | Furukawa | |
| 7,800,876 | B2* | 9/2010 | Peker | H05B 33/0869 |
| | | | | 345/102 |
| 9,137,873 | B2* | 9/2015 | Bradford | H05B 33/0893 |
| 9,246,403 | B2* | 1/2016 | Siessegger | H05B 33/0803 |
| 2005/0231459 | A1 | 10/2005 | Furukawa | |

(Continued)

FOREIGN PATENT DOCUMENTS

| JP | 2003-208993 | 7/2003 |
| JP | 2005-310998 | 11/2005 |
| JP | 2007-327753 | 12/2007 |

(Continued)

*Primary Examiner* — Thuy Vinh Tran
(74) *Attorney, Agent, or Firm* — Hamre, Schumann, Mueller & Larson, P.C.

(57) ABSTRACT

A semiconductor light source driving apparatus includes a light source unit including plural light source modules connected in series, each light source module including a series circuit including one or more series-connected light source elements and a switching element connected in parallel with the series circuit, a current detection unit for detecting a current flowing into the light source unit, and a controller. The controller identifies a light source module including a light source element which has disconnection failure based on a signal from the current detection unit, and stores information indicating the identified light source module in the memory unit. The controller turns on the switching element of the light source module including the light source element having disconnection failure based on the information stored in the memory unit to solve the disconnection failure.

8 Claims, 10 Drawing Sheets

(56) References Cited

U.S. PATENT DOCUMENTS

| | | | |
|---|---|---|---|
| 2007/0159750 A1* | 7/2007 | Peker | H05B 33/0869 361/93.1 |
| 2010/0109537 A1 | 5/2010 | Nishino et al. | |

FOREIGN PATENT DOCUMENTS

| | | |
|---|---|---|
| JP | 2008-130989 | 6/2008 |
| JP | 2009-302295 | 12/2009 |

* cited by examiner

SEMICONDUCTOR LIGHT SOURCE DRIVING APPARATUS AND A PROJECTION TYPE DISPLAY APPARATUS

BACKGROUND

1. Technical Field

The present disclosure is related to a semiconductor light source driving apparatus which drives semiconductor light source elements, such as light emitting diodes and laser diodes, and a projection type display using the semiconductor light source driving apparatus.

2. Related Art

JP 2009-302295 A discloses a semiconductor light source driving apparatus capable of continuously driving series-connected light emitting diodes which have no disconnection failure to emit a light and informing a user of disconnection failure, even after the disconnection failure occurs in one or more of series-connected light emitting diodes.

This semiconductor light source driving apparatus is provided with a plurality of series-connected light emitting diodes, a power supply circuit which supplies electric power to the light emitting diodes, and a detection unit which detects disconnection when the disconnection occurs in either one of light emitting diodes. The semiconductor light source driving apparatus is further provided with resistors connected in parallel with the respective light emitting diodes, switch elements connected to the respective resistors in series, and an indicator which indicates the disconnection.

The semiconductor light source driving apparatus is further provided with a controller which controls a switch element so that when the disconnection occurs in one of light emitting diodes, a current flows through the resistor connected in parallel with the light emitting diode having the disconnection. This arrangement enables lighting operation of the light emitting diodes other than the light emitting diode in which disconnection occurs. The controller controls the indicator to inform a user of the disconnection.

By such a configuration, even after disconnection failure occurs in one or more of series-connected light emitting diodes, the light emitting diodes having no disconnection failure can continuously be driven to emit light and the disconnection failure can be informed a user.

SUMMARY

The present disclosure provides a semiconductor light source driving apparatus for driving a plurality of series-connected semiconductor light source elements, which allows the semiconductor light source elements having no disconnection failure to continuously emit light, even when the disconnection failure occurs in a part of semiconductor light source elements.

A semiconductor light source driving apparatus of the present disclosure includes: a light source unit comprising plural light source modules which are connected in series, each light source module including a switching element which is controlled to be turned on/off by a control signal; and a series circuit connected in parallel with the switching element, the series circuit including one or more series-connected light source elements; a DC power supply unit configured to supply a DC voltage to the light source unit; a current detection unit configured to detect a current flowing into the light source unit; a switching element driving unit configured to drive the switching element of the light source module to turn on/off the switching element; a memory unit; and a controller configured to control the DC power supply unit and the switching element driving unit.

The controller identifies a light source module including a light source element which has disconnection failure based on a signal from the current detection unit, and stores information indicating the identified light source module in the memory unit, and turns on the switching element of the light source module including the light source element which has disconnection failure based on the information stored in the memory unit in order to solve the disconnection failure.

A projection type display apparatus of the present disclosure includes the semiconductor light source driving apparatus as described above.

The semiconductor light source driving apparatus of the present disclosure which drives series connected plural semiconductor elements can continuously drive semiconductor elements which have no failure even when one or more of the semiconductor light source elements have disconnection failure, and can reduce unnecessary power consumption in the semiconductor light source element(s) with disconnection failure.

DETAIL DESCRIPTION OF EMBODIMENTS

Embodiments will be described in detail below by referring to the drawings as necessary. However, it is noted that an unnecessarily detailed description may be omitted. For example, a detailed description of already well-known matters or an overlapping description of substantially the same configuration may be omitted. This is to avoid the following description from unnecessarily becoming redundant and facilitate understanding by those skilled in the art.

It is noted that the inventor provides the accompanying drawings and the following description in order for those skilled in the art to thoroughly understand the present disclosure, and thus, it is not intended that the subject matter described in the claims is limited thereby.

First Embodiment

Figure 1:
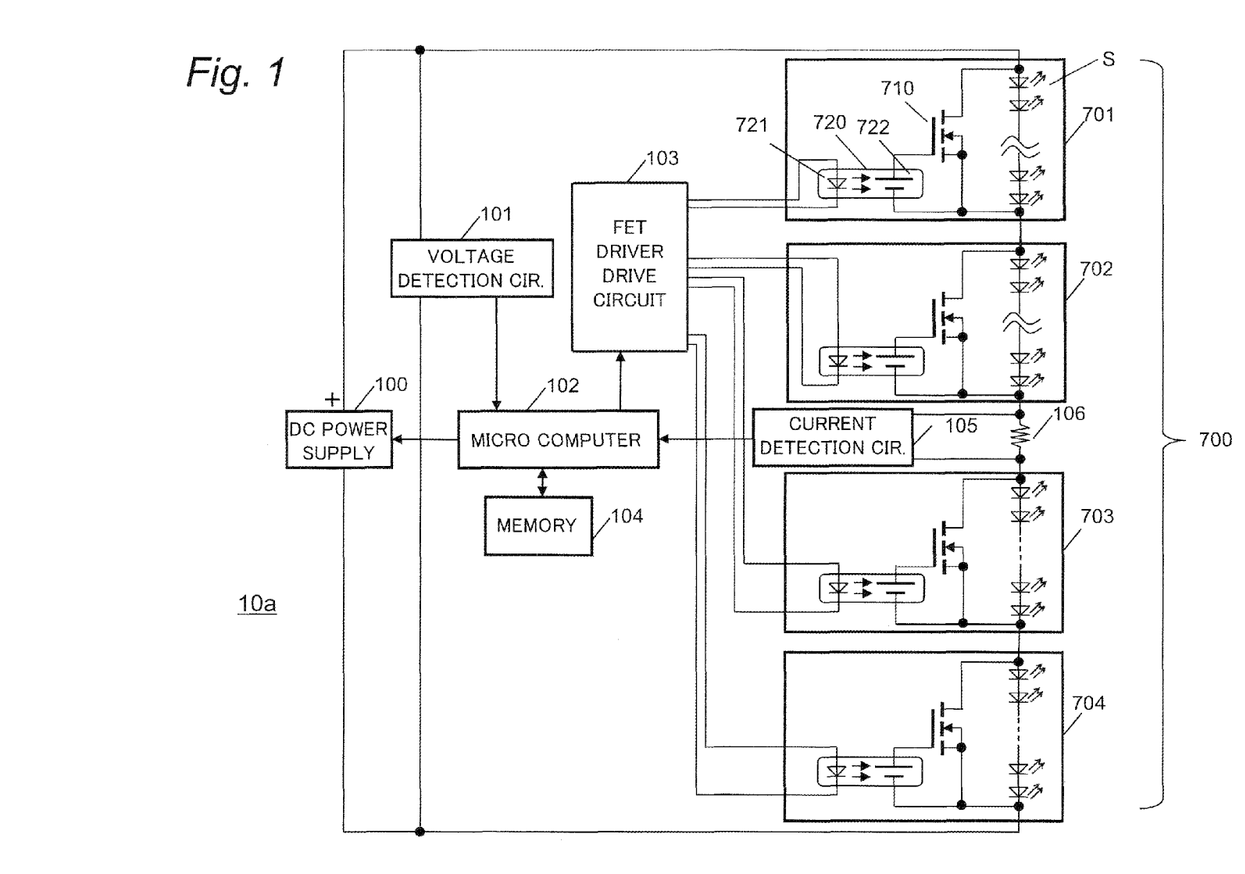
FIG. 1 shows a block diagram showing a configuration of a light source driving apparatus of a first embodiment.

The first embodiment is described below using FIGS. 1 and 2.
1-1. Configuration
FIG. 1 is a block diagram showing a configuration of the semiconductor light source driving apparatus according to the first embodiment. The semiconductor light source driving apparatus 10*a* is provided with a plurality of light source modules 701-704, a current detection circuit 105 which detects a current flowing into the light source modules 701-704, and an FET driver drive circuit 103 which short-circuits light source module 107 having disconnection failure. The semiconductor light source driving apparatus 10*a* is further provided with a DC power supply 100 (DC power supply circuit) which supplies a plurality of light source modules 701-704 with driving power, a voltage detection circuit 101 which detects a voltage of the DC power supply 100, a microcomputer 102 which controls DC power supply 100, and a memory 104.

Each light source module 701-704 is provided with a series circuit including a plurality of semiconductor light source elements S which are series-connected, an N-channel FET 710 connected in parallel to the series circuit, and a FET driver 720. The FET driver 720 includes a LED 721 and a photoelectric cell 722, and the output of the photoelectric cell 722 is connected between gate and source of the N-channel FET 710.

As a semiconductor light source element S, a laser diode can be used, for example. Four light source modules are connected in series as an example.

The four light source modules 701-704 series-connected compose a light source unit 700. In the light source unit 700, a current detection resistor 106 is connected in series between the light source module 702 and the light source module 703, and detects a current flowing into each light source module 701-704. A current detection circuit 105 amplifies a voltage across the current detection resistor 106.

The DC power supply 100 applies a voltage for driving the light source modules 701-704 across the light source unit 700 to which the current detection resistor 106 is connected in series.

The voltage detection circuit 101 detects the output voltage of the DC power supply 100.

The FET driver drive circuit 103 drives the LEDs 721 of FET drivers 720 of light source modules 701-704 to emit light to make photoelectric cell 722 generate electromotive force, so that the gate potential of N-channel FET 710 of each light source module 701-704 is controlled to control ON and OFF of N-channel FET 710.

The microcomputer 102 inputs the output of voltage detection circuit 101 and the current detection circuit 105, and controls the DC power supply 100, the FET driver drive circuit 10, and the memory 104. The microcomputer 102 may be configured by a dedicated hardware circuitry designed to realize at least the function explained below, or include CPU and MPU which executes a program for realizing the function which is explained below.

The memory 104 is a storage device which stores information indicating a light source module in which disconnection failure occurs, and is, for example, a flash memory.

Figure 2:
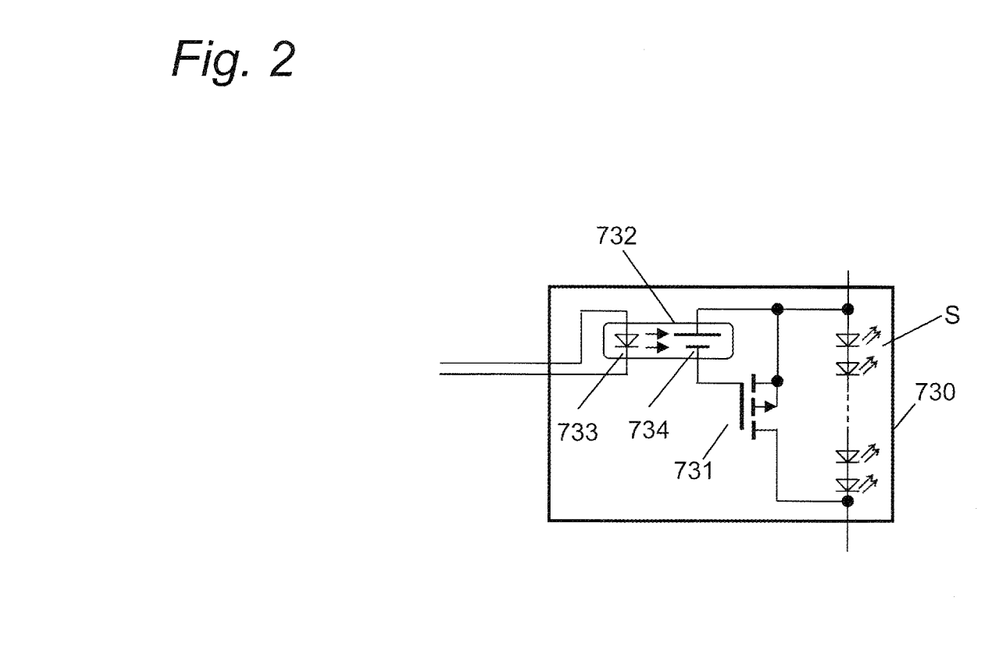
FIG. 2 shows a configuration of another example of the light source module of the semiconductor light source driving apparatus of the first embodiment.

FIG. 2 is a diagram showing other example of a configuration of the light source module which can be used in the semiconductor light source driving apparatus in the first embodiment. The configuration shown in FIG. 1 uses an N-channel FET to short-circuit the semiconductor light source elements, however the configuration shown in FIG. 1 uses a P-channel FET.

The light source module 730 shown in FIG. 2 is provided with a series circuit including a plurality of semiconductor light source elements S connected in series, a P-channel FET 731 connected in parallel to the series circuit, and an FET driver 732. The FET driver 732 includes a LED 733 and a photoelectric cell 734 with the output of the photoelectric cell 734 connected between the gate and source of the P-channel FET 731. The light source module 730 shown in FIG. 2 has a function equivalent to each of the light source modules 701-704 shown in FIG. 1.

In the example of shown in FIG. 1, the four light source modules 701-704 and the current detection resistors 106 are connected in series, composing the light source unit 700. In this case, the position at which the current detection resistor 106 is located can be considered to be various positions. For example, when four light source modules are connected in series, one light source module 701 may be located between current detection resistor 106 and the positive terminal of DC power supply 100 and three light source modules 702-704 may be located between the current detection resistor 106 and the negative terminal of the DC power supply 100.

However, in such a configuration, the maximum potential difference between the current detection circuit 105 or the microcomputer 102 to which the current detection resistor 106 is connected, and a light source module becomes maximum in the light source module connected to the negative terminal of the DC power supply 100, becoming three times higher than the potential difference for the light source module connected to the positive terminal of the DC power supply 100.

Therefore, the current detection resistor 106 may be preferably located mostly at middle position in the light source modules which are series-connected. For example, the configuration of arranging two light source modules between the current detection resistor 106 and the positive terminal of the DC power supply 100, and arranging two light source modules between the current detection resistor 106 and the negative terminal of the DC power supply 100 is preferred, as shown in this embodiment. This arrangement allows a voltage of a light source module to be lowered as much as possible.

1-2. Operation
An operation of the semiconductor light source driving apparatus 10*a* constituted as above is explained below.
(1) Operation of Detecting Disconnection Failure
The detecting operation of disconnection failure is explained using a flow chart of FIG. 3. When all the semiconductor light source elements in the light source module 701-704 have not been subject to disconnection failure, the microcomputer 102 controls the DC power supply 100 to raise the voltage applied to the series circuit of the light source modules 701-704 and the current detection resistor 106 (S11). Along with the rise of output voltage, a current begins to flow into the series circuit of the light source modules 701-704 and the current detection resistor 106.

Figure 3:
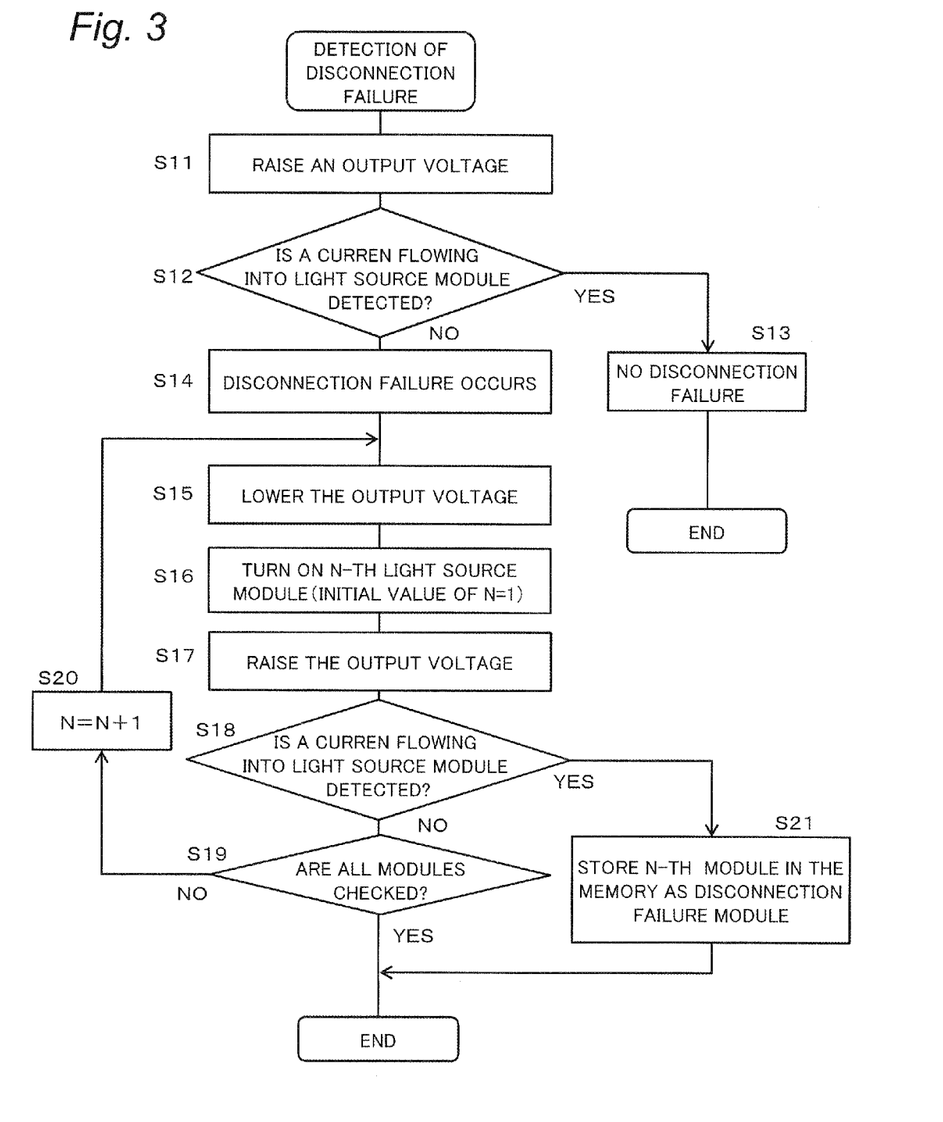
FIG. 3 is a flow chart of disconnection failure detection operation of the semiconductor light source driving apparatus of first embodiment

The current is detectable using the current detection resistor 106 and the current detection circuit 105. The microcomputer 102 judges disconnection failure of the semiconductor light source element 107a in the light source module 701-704 based on the voltage detected in the voltage detection circuit 101. Specifically, the microcomputer 102 checks whether a predetermined current flows into the light source modules 701-704, when the voltage output of the DC power supply 100 supplies the voltage beyond a predetermined value (S12). When the predetermined current flows into the light source modules 701-704, it is judged that no semiconductor light source element S of the light source modules 701-704 has disconnection failure (S13). On the other hand, when the predetermined current does not flow into the light source modules 701-704, it is judged that the semiconductor light source elements S of at least one of the light source modules 701-704 has disconnection failure (S14).

When the disconnection failure occurs in the semiconductor light source element S of at least one of light source modules 701-704, even if the DC power supply 100 generates the voltage beyond a predetermined value, the predetermined current does not flow into the light source modules 701-704. Therefore, by detecting the current which flows into the light source modules 701-704, the microcomputer 102 can detect that the disconnection failure occurs in the semiconductor light source element of either of the light source modules 701-704.

When detecting that disconnection failure occurs in the semiconductor light source element S in either of the light source modules 701-704 (S14), the microcomputer 102 controls the DC power supply 100 to cause the output voltage to be reduced once (S15).

Then, the microcomputer 102 controls the FET driver drive circuit 103 to select either one of the light source modules 701-704 and turn on the FET 710 in the selected light source module (S16). Hence the light source module 107 containing the semiconductor light source element in which disconnection failure occurs is short-circuited, recovering from the disconnection failure. Then, the microcomputer 102 controls the DC power supply 100 to raise the output voltage (S17). When it is detected that a current flows in condition that the output voltage of the DC power supply 100 is not more than a predetermined voltage (YES at S18), it can detect that the semiconductor light source element of the turned-on light source module has disconnection failure.

On the other hand, when it is not detected that the current flows, the output voltage of the DC power supply 100 is reduced again (S15), after that, the FET of other light source module is turned on (S20, S16), and the same check is performed. By repeating such an operation until the current flowing is detected (S15-S20), it is possible to identify which light source module is subjected to disconnection failure.

When identifying the light source module 107 containing the semiconductor light source element which has disconnection failure, the microcomputer 102 stores information which indicates the semiconductor light source element which has disconnection failure in the memory 104 (S21).

(2) Operation at the start of Semiconductor Light Source Driving Apparatus

Figure 4:
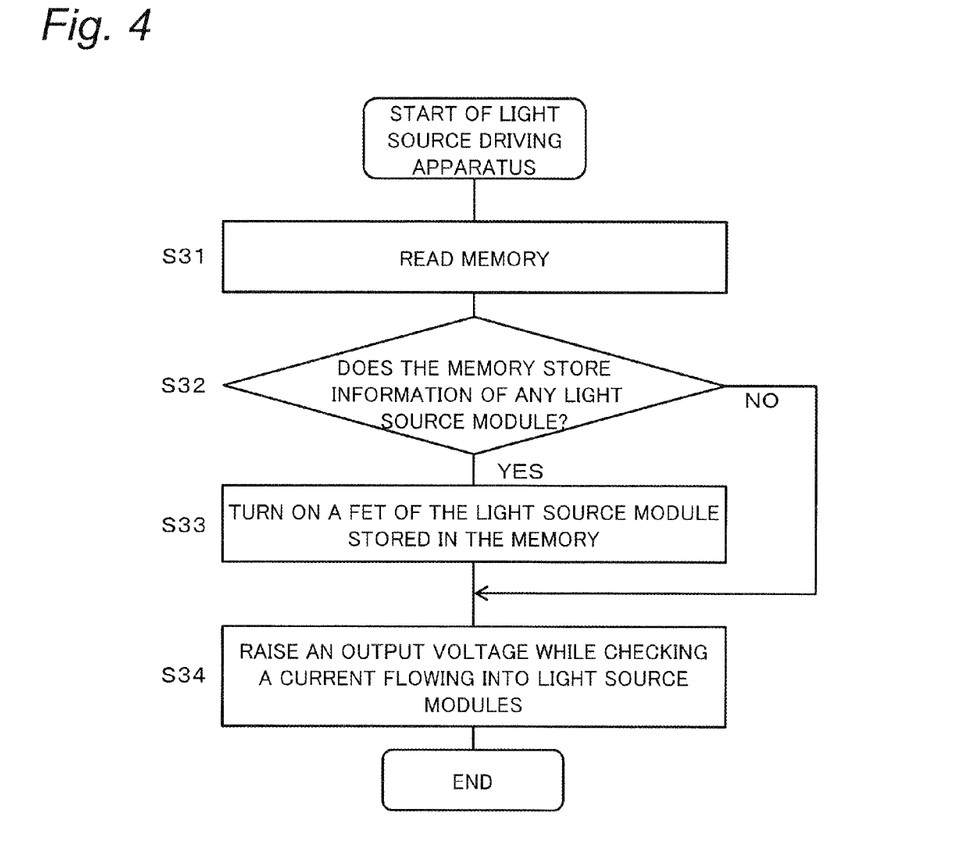
FIG. 4 is a flow chart of the operation at start of the semiconductor light source driving apparatus of first embodiment.

The operation performed at starting of semiconductor light source driving apparatus 10a is explained using the flow chart of FIG. 4.

When starting the semiconductor light source driving apparatus 10a and driving semiconductor light source modules 701-704, the FET of the light source module which contains the semiconductor light source element which has disconnection failure is turned on based on the information previously stored in the memory 104. This allows the other light source modules which have no disconnection failure to continuously operate to emit light.

Specifically, the microcomputer 102 accesses the memory 104 first, and reads the stored information (S31). When the memory 104 stores the information of a light source module (YES at S32), the microcomputer 102 identifies the light source module which contains the semiconductor light source element which has disconnection failure based on the information stored in the memory 104, and turns on, in advance, the FET 710 of the identified light source module 701-704 (S33). Then, the control is performed which raises the voltage of the DC power supply 100 gradually while checking the current which flows into the light source modules 701-704 (S34). The reason controlled in this way is explained below.

If a control which raises the voltage of the DC power supply 100 and then turns on the FET 710 is performed, the problem that an over-current flows into a normal light source module at the moment of turning on the FET 710 occurs.

In view of this problem, in the present embodiment, the FET is turned on in advance and thereafter the output voltage of the DC power supply is raised to prevent an over-current.

On the other hand, when the information of a light source module is not stored in the memory 104 (NO at S32), the voltage of the DC power supply 100 is raised gradually, while checking the current which flows into the light source modules 701-704 (S34).

When the current which flows into the light source modules 701-704 cannot be detected even if the predetermined output voltage is supplied in Step S34, the processing of Steps S15 to S21 in the flow chart of the aforementioned FIG. 3 is executed so that the light source module having disconnection failure is short-circuited and the information of that light source module is stored in the memory 104

(3) Another Example of Detecting Operation of Disconnection Failure

Identifying of the light source module which contains the semiconductor light source element having disconnection failure after detection of disconnection failure can be performed in another way.

For example, FETs 107b of all the light source modules 107 other than the light source module to be checked are turned on, while the FET of the light source module to be checked is kept off. Then, the output voltage of DC power supply 100 is raised, and it is detected whether a predetermined current flows into the light source modules 701-704. When the flowing current is not detected, the light source module 107 to be checked is identified to be a light source module which contains the semiconductor light source element having disconnection failure. On the other hand, when the flowing current is detected, the module to be checked is changed and the above-mentioned processing is performed thereon. That is, the above-mentioned processing is repeated until a light source module including disconnection failure is identified.

Alternatively, the following method is also considered as a way of identifying the module including disconnection failure.

The voltage of the DC power supply 100 is raised and a current is detected in the state that the FETs 720 in half of all light source modules 701-704 are turned on. Based on the detection result, it is judged whether the light source module which contains the semiconductor light source element having disconnection failure is contained in the group of light source modules of which FETs 720 are turned on.

When the semiconductor light source module having disconnection failure is contained in the group of light source modules of which FETs are turned on, the above-mentioned operation is performed in the state that FETs in half of the group of the light source modules of which FETs are already turned on are turned on.

On the other hand, when the semiconductor light source module having disconnection failure is not contained in the group of the light source modules of which FETs are turned on, it can be judged that the semiconductor light source element module having disconnection failure is contained in the group of the light source modules of which FETs are not turned on. Therefore, in order to detect the light source module having disconnection failure, the half of the group of the light source modules of which FETs are not turned on are turned on, so that the semiconductor light source modules expected to have disconnection failure are narrowed down.

By using the dichotomizing search as described above to narrow down a range of the light source modules having disconnection failure, the light source module which has disconnection failure can be identified.

According to this embodiment, when disconnection failure occurs, the light source module 701-704 which contains the semiconductor light source element having the disconnection failure is short-circuited by the FET 710. An FET which has small ON resistance is employed as the FET 710, so that the voltage drop of the light source module which does not emit light (is forcibly short-circuited) can be made small. If the power supply of which input power is mostly proportional to output power, such as switching power supply, is used as DC power supply 100, it is enough that the DC power supply 100 supplies electric power only to the light source modules which emit light, so that unnecessary power consumption can be saved when the disconnection failure occurs.

1-3. Effect, Etc.

As mentioned above, the semiconductor light source driving apparatus 10a of this embodiment includes light source unit 700 which contains plural light source modules 701-704 which are connected in series. Each light source module 701-704 contains the FET 710 (an example of a switching element) which is controlled to be ON or OFF state by a gate signal (an example of a control signal), and a series circuit connected in parallel with the FET 710. The series circuit includes one or more series-connected semiconductor light source elements S (an example of a light source element). Further, the semiconductor light source driving apparatus 10a includes the DC power supply 100 (an example of a DC power supply unit) which supplies a direct current voltage to a light source unit, the current detection circuit 105 which detects the current which flows into the light source unit, the FET driver drive circuit 103 (an example of a switching element driver) which drives the FET 710 of each light source module to be ON or OFF state, and the memory 104. Further the semiconductor light source driving apparatus 10a includes the microcomputer 102 (an example of a controller) which controls the DC power supply 100 and the FET driver drive circuit 103, and the memory 104 (an example of a memory unit). The microcomputer 102 identifies the light source module containing the semiconductor light source element having disconnection failure based on the signal from the current detection circuit 105, and stores the information which indicates the identified light source module in the memory 104. The microcomputer 102 causes the FET of the light source module containing the semiconductor light source element having disconnection failure to be turned on based on the information stored in the memory 104 to solve the disconnection failure.

More specifically, the microcomputer 102 controlling the DC power supply 100 detects a relationship between a voltage applied to the light source unit 700 including series-connected light source modules and a current flowing therein with the voltage detection circuit 101, the current detection resistor 106, and the current detection circuit 105, to determine which light source module includes the semiconductor light source element in which the disconnection failure occurs.

The microcomputer 102 sets the output voltage of the DC power supply 100 to be lowered (S15) and controls the FET driver drive circuit 103 to turn on the FET of the light source module (S16). Afterward, the microcomputer 102 raises the voltage of DC power supply 100 (S17), and detects the relationship between the voltage applied to the series-connected light source modules and the current flowing therein (S18). Based on the detection result, the microcomputer 102 identifies the light source module containing the semiconductor light source element in which the disconnection failure occurs, and stores the information indicating the identified light source module in the memory 104 (S21).

Then, the microcomputer 102 turns on in advance the FET of the light source module which contains the semiconductor light source element having disconnection failure (S33) before turning on the light source modules 701-704, and then raises the output voltage of the DC power supply 100 while checking the current flowing into the light source modules. Thereby, the disconnection failure can be solved. Further, since the output voltage of DC power supply 100 is raised after FETs of the light source modules are turned on, an over-current can be prevented from flowing into other light source modules than the light source module having disconnection failure at the moment of turning on the FET of the light source module having disconnection failure. Further, since the light source module having disconnection failure is being short-circuited by the FET, power consumption becomes very small and unnecessary power consumption can be reduced.

Second Embodiment

Hereinafter, a semiconductor light source driving apparatus of the second embodiment is explained using FIG. 5. A configuration of the semiconductor light source driving apparatus 10b of the second embodiment differs from that of the first embodiment in a configuration to short-circuit the light source module containing the semiconductor light source element having disconnection failure. The other configurations and operations are the same as those of the first embodiment.

2-1. Configuration

Figure 5:
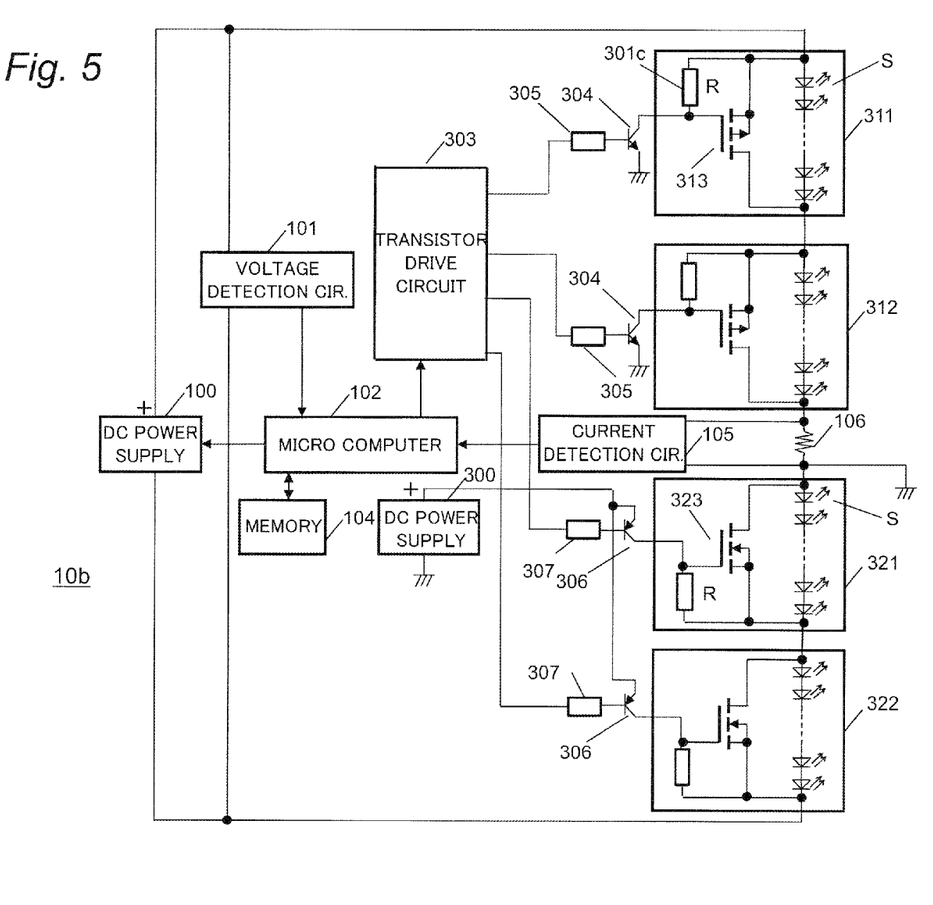
FIG. 5 is a block diagram showing a configuration of the semiconductor light source driving apparatus in a second embodiment.

FIG. 5 is a block diagram showing the configuration of the semiconductor light source driving apparatus 10b according to the second embodiment.

The present embodiment uses a first type of light source modules 311 and 312 which are located at relatively high voltage side and a, second type of light source modules 321 and 322 which are located at relatively low voltage side, instead of the light source modules 701-704 in the first embodiment. In the present embodiment, although two of first type of light source modules and two of second type of light source modules are provided, the number of each type of light source modules is not limited to this.

Each of the first type of light source modules 311 and 312 includes a P-channel FET 313 as a switching element. The series circuit including one or more semiconductor light source elements S is connected between a drain and a source of the P-channel FET 313, and a resistor R is connected between the source and a gate of the P-channel FET 313. The gate is connected to a collector of a NPN transistor 304 which is a transistor for driving the P-channel FET 313.

Each of the second type of light source modules 321 and 322 includes an N-channel FET 323 as a switching element. The series circuit including one or more semiconductor light source elements is connected between a drain and a source of the N-channel FET 323, and a resistor R is connected between a gate and the source of the N-channel FET 323. The gate is connected to a collector of a PNP transistor 306 which is a transistor for driving the N-channel FET 323.

Instead of the FET driver drive circuit 103 in the first embodiment, a transistor drive circuit 303 which drives the NPN transistor 304 and the PNP transistor 306 is used. The transistor drive circuit 303 is controlled by the microcomputer 102.

A level shift circuit which includes a resistor 305 and the NPN transistor 304 is inserted between the output of the transistor drive circuit 303 and each of the light source modules 311 and 312. The collector of the NPN transistor 304 is connected to the gate of the P-channel FET 313.

A level shift circuit which includes a resistor 307, the PNP transistor 306, and a DC power supply 300 is inserted between the output of the transistor drive circuit 303 and each of light source modules 321 and 322. The collector of the PNP transistor 306 is connected to the gate of the N-channel FET 323.

2-2. Operation

An operation of the semiconductor light source driving apparatus 10b configured as mentioned above is explained below. Especially in the following, the operation for short-circuiting the light source modules 311-322 including disconnection failure is explained.

In the first type of light source modules 311 and 312, a voltage across the resistor R inserted between the source and gate of the P-channel FET313 is controlled by a collector current of the NPN transistor 304. The collector current of the NPN transistor 304 is controlled by a current which flows into the resistor 305. Therefore, it is possible to control ON and OFF of the light source modules 311 and 312, by controlling the output voltage of the transistor drive circuit 303 to control the current flowing into the resistor 305.

In the second type of light source modules 321 and 322, a voltage across the resistor R inserted between the gate and source of the N-channel FET 323 is controlled by a collector current of the PNP transistor 306. The collector current of the PNP transistor 306 is controlled by a current which flows into the resistor 307. Therefore, it is possible to control ON and OFF of the light source modules 321 and 322, by controlling the output voltage of the transistor drive circuit 303 to control the current which flows into the resistor 305.

The other operations, that is, the identifying operation of the light source module having disconnection failure, the operation at the starting of the semiconductor light source driving apparatus 10b, and so on, are the same as those of the semiconductor light source driving apparatus 10a of the first embodiment. Thus the explanations thereof are omitted here.

2-3. Effect etc.

As mentioned above, in this embodiment, the same effect as the first embodiment can be achieved.

Third Embodiment

Hereinafter, a semiconductor light source driving apparatus of the third embodiment is explained using FIG. 6.

3-1. Configuration

Figure 6:
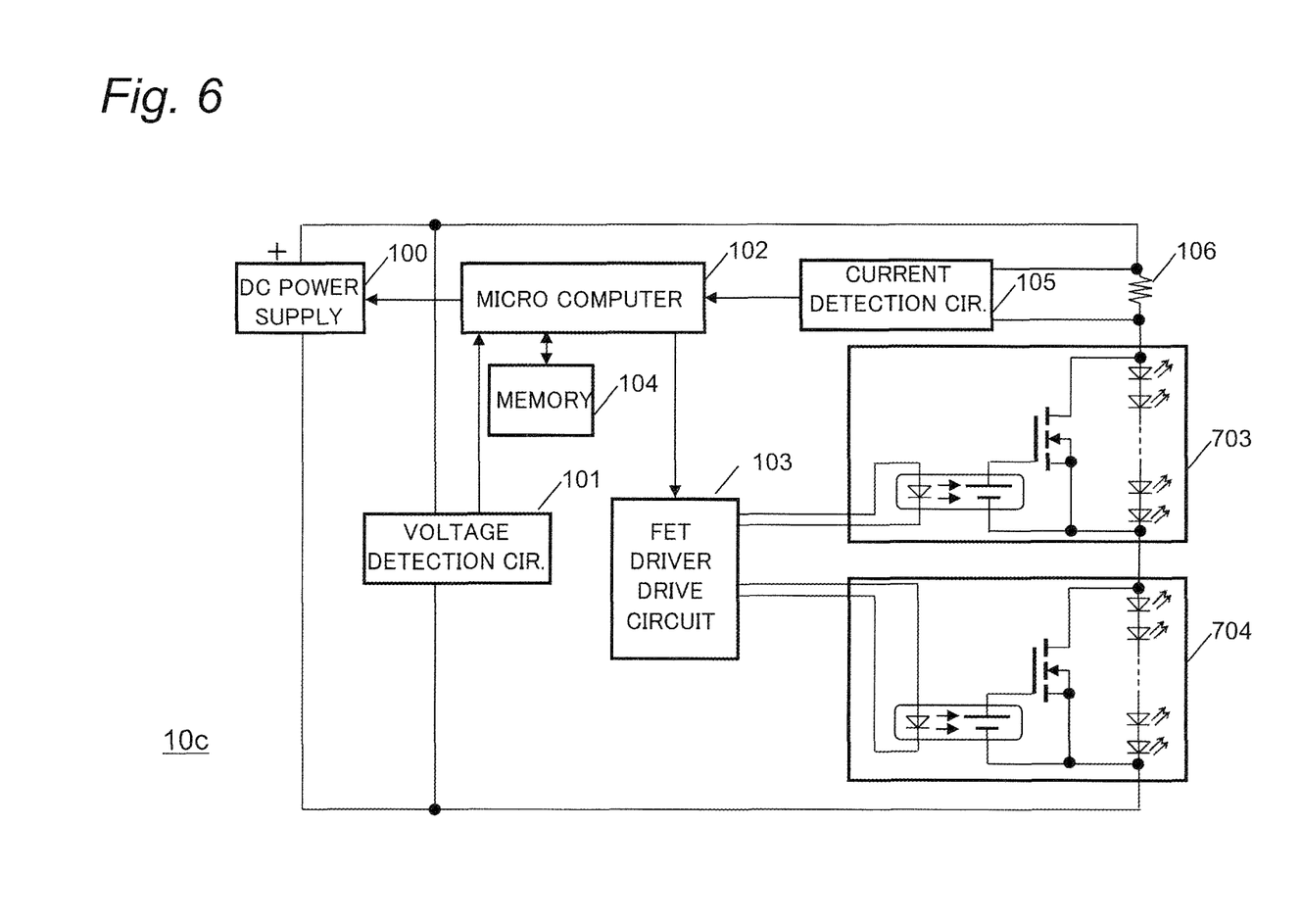
FIG. 6 is a block diagram showing a configuration of the semiconductor light source driving apparatus in a third embodiment.

FIG. 6 is a block diagram showing a configuration of the semiconductor light source driving apparatus 10c according to the third embodiment.

The semiconductor light source driving apparatus 10c of the third embodiment differs from that of the first embodiment in the position of the current detection resistor 106. Specifically, in the first embodiment, the current detection resistor 106 is arranged in the middle position of line of the light source modules 701-704. On the contrary, in the present embodiment, the current detection resistor 106 is arranged between the positive terminal of the DC power supply 100 and the light source module 703 located at most high voltage side. It is noted that, for simplification of explanation, FIG. 6 shows an example which uses two light source modules.

3-2. Operation

An operation of the semiconductor light source driving apparatus 10c configured as mentioned above is explained below.

The current detection resistor 106 detects a current which flows into the light source modules 703 and 704 with respect to the positive terminal of the DC power supply 100, and the current detection circuit 105 performs current detection with respect to the positive terminal of the DC power supply 100. The other operations are the same as those of the semiconductor light source driving apparatus 10a in the first embodiment.

3-3. Effect, Etc.

According to the configuration of the present embodiment, in addition to the effect of the semiconductor light source driving apparatus in the first embodiment, the effect that the current detection can be performed with respect to the positive terminal of the DC power supply 100 can be achieved.

Fourth Embodiment

Hereinafter, a semiconductor light source driving apparatus according to the fourth embodiment is explained using FIG. 7.

4-1. Configuration

Figure 7:
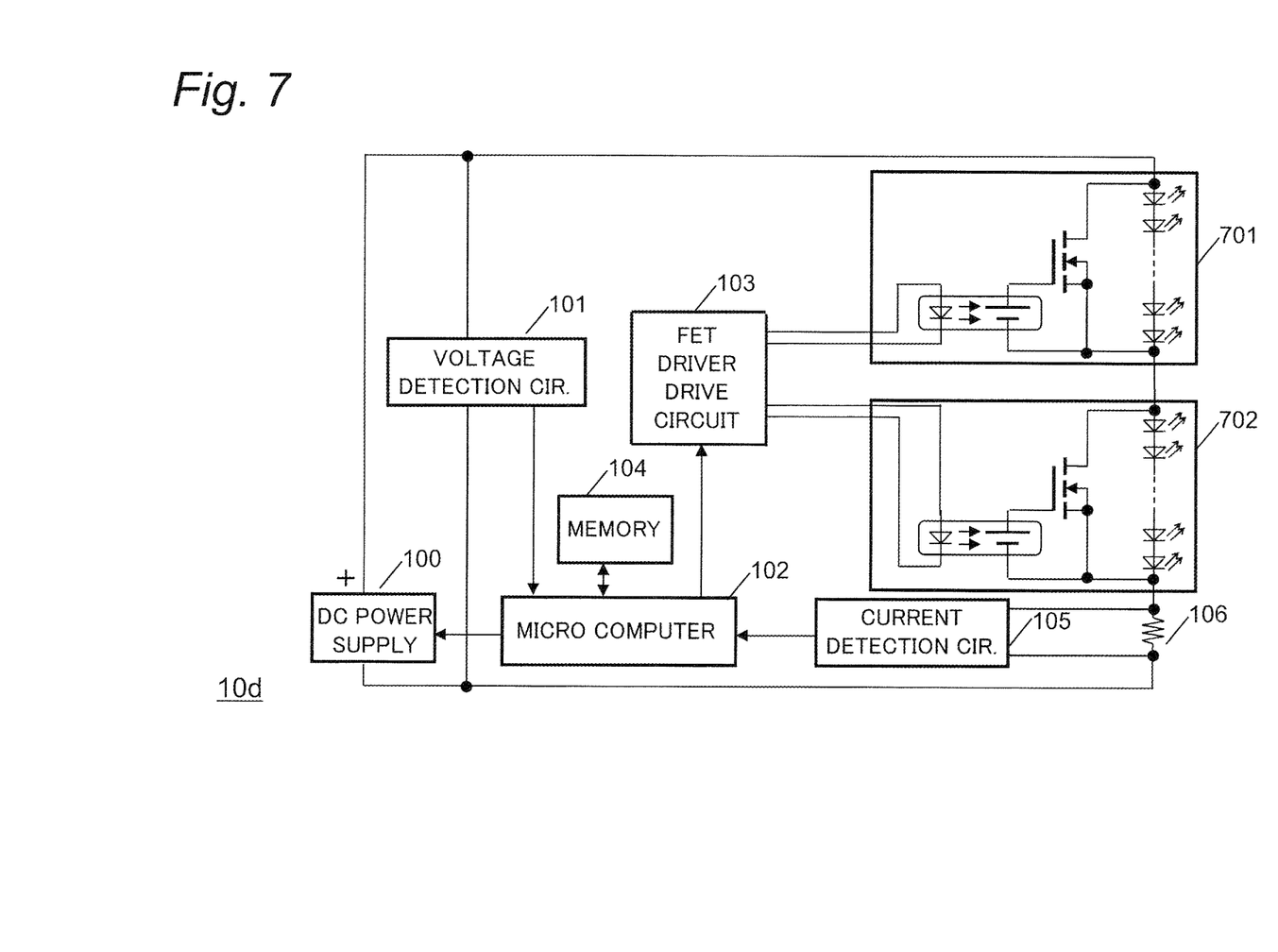
FIG. 7 is a block diagram showing a configuration of the semiconductor light source driving apparatus in a fourth embodiment.

FIG. 7 is a block diagram showing a configuration of the semiconductor light source driving apparatus 10d according to the fourth embodiment.

The semiconductor light source driving apparatus 10d according to the fourth embodiment differs from that of the first embodiment in the position of the current detection resistor 106. Specifically, in the present embodiment, the current detection resistor 106 is positioned between the negative terminal of the DC power supply 100 and the light source module 701 which is arranged at the lowest voltage side. FIG. 7 shows an example using two light source modules, for simplification of explanation.

4-2. Operation

An operation of the semiconductor light source driving apparatus 10d configured as mentioned above is explained below.

The current detection resistor 106 detects the current which flows into the light source modules 701 and 702 with respect to the negative terminal of the DC power supply 100. The current detection circuit 105 detects the current with respect to the positive terminal of the DC power supply 100. The other operations are the same as those of the semiconductor light source driving apparatus 10 in the first embodiment.

4-3. Effect, Etc.

As mentioned above, according to the configuration of this embodiment, the effect that the current detection can be performed with respect to the negative terminal of the DC power supply 100 can be achieved in addition to the effect of the first embodiment.

Fifth Embodiment

Hereinafter, a semiconductor light source driving apparatus of the fifth embodiment is explained using FIG. 8.

5-1. Configuration

Figure 8:
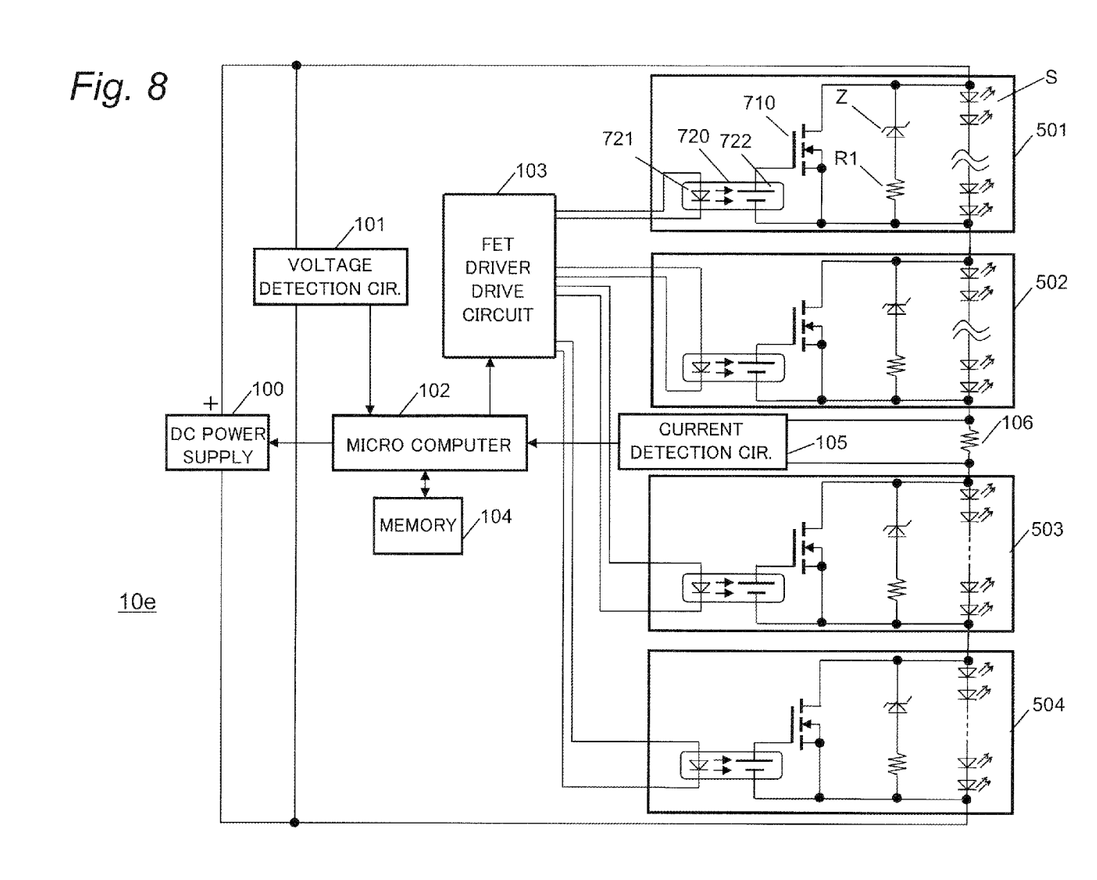
FIG. 8 is a block diagram showing a configuration of the semiconductor light source driving apparatus in a fifth embodiment.

FIG. 8 is a block diagram showing a configuration of the semiconductor light source driving apparatus according to the fifth embodiment. The semiconductor light source driving apparatus 10e of the fifth embodiment differs from that of the first embodiment in the configuration of the light source module.

The semiconductor light source driving apparatus 10e of the fifth embodiment has the same configuration as the configuration of the first embodiment excepting for light source modules 501 to 504 which replace the light source modules 701-704. For simplification of explanation, the same reference signs are provided to the same components or elements as those of the first embodiment.

Each of light source modules 501 to 504 of the fifth embodiment has the same configuration as the light source module 701 to 704 in the first embodiment, and further includes a series circuit which is connected between the drain and source of the N-channel FET 710 and includes a zener diode Z and a current limiting resistor R1.

5-2. Operation

An operation of the semiconductor light source driving apparatus 10e configured as mentioned above is explained below.

A zener diode which has a breakdown voltage higher than a voltage occurs at the series circuit of the semiconductor light source elements in the light source modules 501-504 which are emitting light is used, as the zener diode Z inserted between the drain and source of the N-channel FET 710 in each light source module 501 to 504.

Since the breakdown voltage of the zener diode Z is higher than the voltage which occurs at the series circuit of the semiconductor light source elements, when disconnection failure does not occur in the semiconductor light source element, a current does not flow into the zener diode Z nor into the current limiting resistor R1. Hence, unnecessary power loss does not occur in the current limiting resistor R1 and the zener diode Z.

On the other hand, when disconnection failure occurs in the semiconductor light source element, the impedance of the series circuit of the semiconductor light source elements of the light source module becomes high, so that the voltage from the DC power supply 100 is concentrated on and applied to the series circuit of the semiconductor light source elements. Therefore, the voltage applied to the zener diode Z becomes higher than the breakdown voltage, and thus the zener diode Z turns on and a current flows. In order to reduce power consumption consumed in the zener diode Z and the current limiting resistor R1, the resistance of the current limiting resistor R1 is set to a value which causes a current flowing when the zener diode Z is turned on due to disconnection failure to be smaller than a current flowing into the light source module when disconnection failure does not occur. By setting the resistance to such a value, a device having small rated power consumption can be used as the zener diode Z or the current limiting resistor R1. In order to effectively reduce a voltage to be applied across the series circuit of the zener diode Z and the current limiting resistor R1, that is, a voltage to be applied between the drain and source of the FET 710, the resistance of the current limiting resistor R1 is set as follows. Specifically, the resistance of the current limiting resistor R1 is set to a value which causes, when disconnection failure occurs in one light source module, a specific voltage to be applied to the other light source module having no disconnection failure. The specific voltage is a voltage not less than 20% of a voltage across the light source module to be applied when no disconnection failure occurs in all of the light source modules. In that case, normally, a current of mA order flows into the light source module having no disconnection failure.

The voltage applied between the drain and source of the FET 710 of the light source module having disconnection failure is an output voltage of the DC power supply 100 minus a voltage of the light source module having no disconnection failure. Therefore, by setting the resistance of the current limiting resistor 507b as mentioned above, the voltage applied between the drain and source of the FET 710 of the light source module 507 having disconnection failure is smaller compared to a voltage occurring when the series circuit of the zener diode Z and the current limiting resistor R is not connected. For this reason, a FET having low withstanding voltage can be used for the FET 710, and thus ON resistance of the FET 710 becomes small, reducing a loss generating when FET 710 turns on.

The other operations, i.e., the specific operation of the light source module having disconnection failure, and the operation at the starting of the semiconductor light source driving apparatus, and so on, are the same as that of the semiconductor light source driving apparatus 10a described in the first embodiment. Thus the explanation thereof is omitted here.

Also in the light source module 730 shown in FIG. 2, the series circuit of the zener diode Z and the current limiting resistor R1 may be connected between the source and gate of the P-channel FET 731, that is, in parallel with series-connected plural semiconductor light source elements S. With this configuration, the same effect as the case where it applies to the light source module shown in FIG. 8 also with this configuration can be achieved.

5-3. Effect Etc.

According to the semiconductor light source driving apparatus 10e of the present embodiment, when disconnection failure occurs, the zener diode Z in the light source module 507 can reduce the voltage applied between the drain and source of the FET 710. Hence the FET 710 having low withstanding resistance can be used, and thus the loss by FET 710 can be reduced.

Sixth Embodiment

Figure 9:
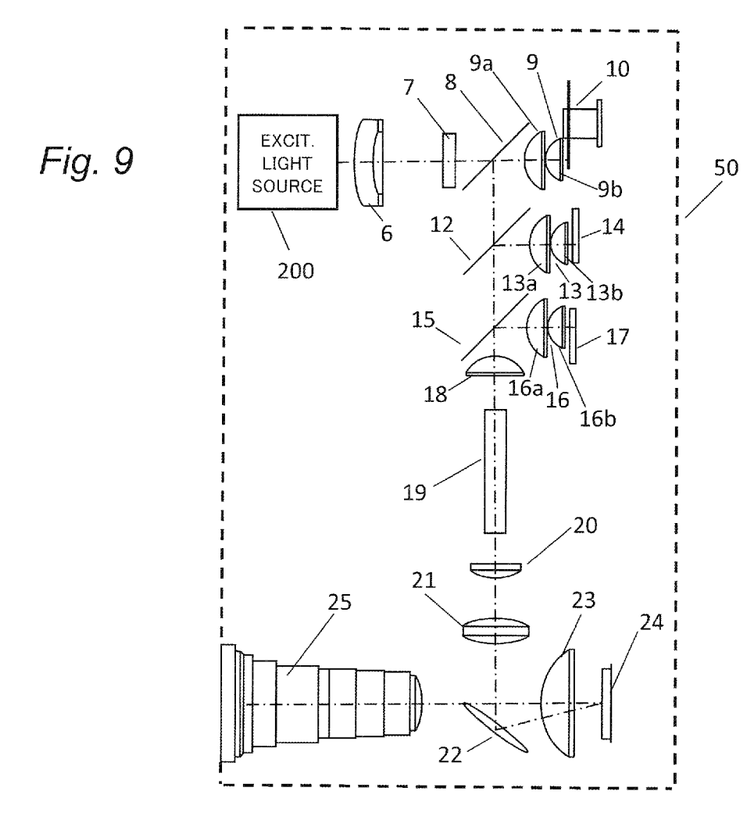
FIG. 9 is a diagram showing a configuration of a projection type display apparatus provided with one of semiconductor light source driving apparatus of first to fifth embodiments.

A projection type display apparatus provided with the semiconductor light source driving apparatus explained in each of above-mentioned embodiments is explained. FIG. 9 is a diagram showing a configuration of the projection type display apparatus 50 of the present embodiment. The projection type display apparatus 50 includes an excitation light source 200, a DMD (Digital Mirror Device) 24, and a projection lens 25. The DMD 24 may be replaced by a liquid crystal display device.

The excitation light source 200 includes any one of the semiconductor light source driving apparatuses 10a to 10e described in the above embodiments. The excitation light source 200 includes a light emission element (semiconductor light source element S) which emits blue light, and outputs a blue excitation light.

A condenser lens 6 collects the blue light outputted from the collimator lenses 5. The blue excitation light exiting from the condenser lens 6 enters a lens 7. The lens 7 transforms the entered light into parallel light.

The excitation blue light exiting from the lens 7 passes through a dichroic mirror 8 which allows blue light to pass therethrough and reflects green light, and then enters a condensing/collimating lens 9 including a pair of convex lenses 9a and 9b.

Green light excited by the excitation light and emitted from the green phosphor of the phosphor wheel 10 enters the condensing/collimating lens 9. The light is collimated by the condensing/collimating lens 9, and exits to the dichroic mirror 8.

The dichroic mirror 8 reflects the green light from the condensing/collimating lens 9, and leads the green light into a dichroic mirror 12 which allows green light to pass therethrough and reflects red light.

A collimating lens 13 includes a pair of convex lenses 13a and 13b. A red emitting device 14 is disposed so as to face the collimating lens 13, and emits red light. The red light from the red emitting device 14 is collimated by the collimating lens 13 and exits to the dichroic mirror 12.

The red light exiting from the collimating lens is reflected by the dichroic mirror 12, subsequently entering a dichroic mirror 15 which allows red light and green light to pass therethrough and reflects blue light.

A collimating lens 16 includes a pair of convex lenses 16a and 16b. A blue emitting device 17 is disposed so as to face the collimating lens 16, and emits blue light. The blue light from the blue emitting device 17 is collimated by the collimating lens 16 and exits to the dichroic mirror 15.

In the above-described manner, light of three colors, i.e. green light, red light, and blue light, enters a condenser lens 18. Specifically, the green light from the phosphor wheel 10 is reflected by the dichroic mirror 8 and then passes through the dichroic mirrors 12 and 15, and enters the condenser lens 18. The red light emitted by the red emitting device 14 is reflected by the dichroic mirror and passes through the dichroic mirror 15, and then enters the condenser lens 18. The blue light emitted by the blue emitting device 17 is reflected by the dichroic mirror 15, and enters the condenser lens 18.

The condenser lens 18 collects the green light, the red light, and the blue light and leads the collected light to one end face of a rod integrator 19. Outgoing light that exiting from the other end face of the rod integrator 19 passes through relay lenses 20 and 21, and then exits to a total reflection mirror 22.

Light reflected by the total reflection mirror 22 enters the DMD 24 passing through a lens 23. The DMD 24 modulates the entered light according to a video signal, and allows the modulated light to exit to the projection lens 25 through the lens 23. The projection lens 25 projects the entered light onto a screen (which is not shown) with enlarged image.

The projection type display apparatus 50 configured as mentioned above can achieve the same effect as explained in the first to fifth embodiments related to the disconnection failure of the semiconductor light source element contained in excitation light source 200.

Other Embodiments

As mentioned above, the first to fifth embodiments are described as illustration of the art disclosed by the present application. However the art of the present application is not limited to this, and thus it can be applied to embodiments where change, replacement, addition and omission are suitably carried out. Further, the components described in the first and second embodiments may suitably be combined so that a new embodiment will be provided. Therefore, other embodiments will be illustrated below. It is also possible to combine each of elements or components explained in the above-mentioned first to fifth embodiments to create a new embodiment.

Therefore, other embodiments are illustrated below.

(1) According to the first to fifth embodiments, the light source module has a plurality of semiconductor light source elements which are connected in series. The number of semiconductor light source elements is not limited to the number as shown above. The number of semiconductor light source elements does not need to be plural, and a single semiconductor light source element may be included in the light source module.

(2) The first to fifth embodiments show the FET as an example of means for short-circuiting a semiconductor light source element. However, means for short-circuiting a semiconductor light source element is not limited to the FET. That is, it may be a switch which can form a new current path. For example, a relay may be used as means to short-circuit the semiconductor light source element, which can reduce loss of the light source module which does not emit light to almost zero. Alternatively, a thyristor may be used as means to short-circuit the semiconductor light source element. Using a thyristor has an advantage to simplify control of ON and OFF.

(3) In the above-mentioned explanation, the detecting operation of the disconnection failure shown in the flow chart of FIG. 3 is explained on the assumption that no semiconductor light source elements in the light source module 701-704 have disconnection failure. However, the operation shown in the flow chart of FIG. 3 is applicable to the case where disconnection failure is already detected and the information thereof is stored in the memory 104. In this case, the operation shown in the flow chart of FIG. 3 may be carried out, on the condition that the FET of the light source module, which has the disconnection failure and is stored in the memory 104, is turned on in advance and is excluded from candidates to be checked.

(4) Although the operation shown in the flow chart of FIG. 4 is performed at the starting of the semiconductor light source driving apparatus, the operation may be performed in the timing of not only the time of starting but also in other timing. For example, the operation may be performed when a predetermined operation button (reset button) is pushed.

Figure 10:
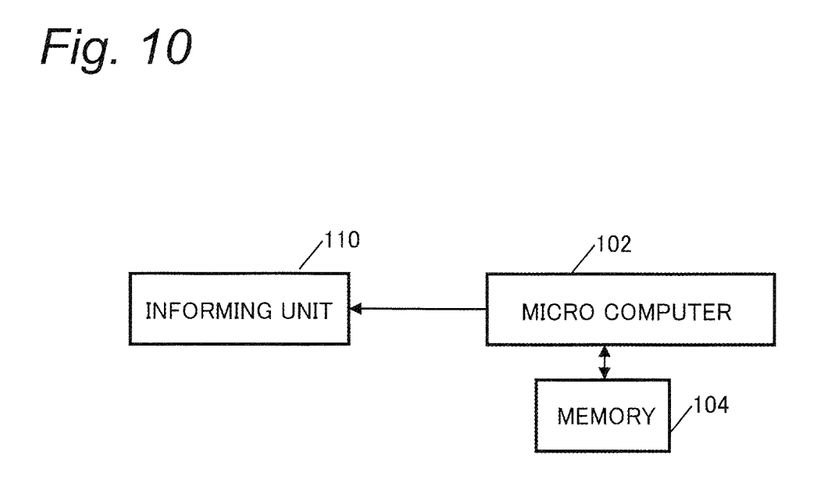
FIG. 10 is a diagram explaining an informing unit which informs a user of the state of disconnection failure in the semiconductor light source driving apparatus.

(5) The semiconductor light source driving apparatus of each of above-mentioned embodiments may be further provided with an informing unit 110 which informs a user of occurrence of disconnection failure and/or the light source module which has disconnection failure, as shown in FIG. 10. The informing unit 110 can include an LED and/or a liquid crystal display (LCD). The informing unit 110 may inform a user of occurrence of disconnection failure, or the like by audio output with a buzzer or a speaker.

As mentioned above, the embodiments are described as illustration of the art of the present disclosure. For this purpose, an accompanying drawings and detailed explanations are provided.

Therefore, the components or elements described in the accompanying drawings and the specification may include not only components or elements essential for solving the problem but also components or elements which is just used for explanation of the art but is not always essential for solving the problem. Therefore, it should not be admitted that those components or elements which are not essential are construed to be essential just for the reason that those are described in the drawings or the specification.

The above-mentioned embodiments are provided for illustrating the art of the present disclosure, and therefore it is possible to apply any type of change, replacement, addition, modification, deletion, and so on to claims or those having equivalent scope thereof.

INDUSTRIAL APPLICABILITY

The present disclosure is applicable to a light source driving apparatus which drives a plurality of light source elements which are connected in series. Specifically, the present disclosure is applicable to a light source for a projector, a light source for a lighting apparatus, and so on.

What is claimed is:

1. A semiconductor light source driving apparatus comprising:
   a light source unit comprising plural light source modules that are connected in series, each light source module including a switching element that is controlled to be turned on/off by a control signal and a series circuit connected in parallel with the switching element, the series circuit including one or more series-connected light source elements;
   a DC power supply unit configured to supply a DC voltage to the light source unit;
   a current detection unit configured to detect a current flowing into the light source unit;
   a switching element driving unit configured to drive the switching element of the light source module to turn on/off the switching element;
   a memory unit for storing information indicating a light source module including a light source element that has disconnection failure; and
   a controller configured to control the DC power supply unit and the switching element driving unit,
      wherein the controller identifies a light source module including a light source element that has the disconnection failure based on a signal from the current detection unit, and stores the information indicating the identified light source module in the memory unit, and
      the controller turns on the switching element of the light source module including the light source element that has the disconnection failure based on the information stored in the memory unit in order to solve the disconnection failure.

2. The semiconductor light source driving apparatus according to claim 1, wherein when the semiconductor light source driving apparatus starts, the controller identifies a light source module based on the information stored in the memory unit, and controls the switching element driving unit to turn on the switching element of the identified light source module, and thereafter the controller raises the output voltage of the DC power supply.

3. The semiconductor light source driving apparatus according to claim 1, wherein the controller controls the switching element driving unit to supply the control signal to the switching element of the light source module to turn on the switching element, and identifies the light source module including the light source element that has disconnection failure based on a signal from the current detection unit output while the switching element is being turned on.

4. The semiconductor light source driving apparatus according to claim 1, wherein
   the switching element is a FET, and the one or more series-connected light source elements are connected between a drain and a source of the FET, and
   the switching element driving unit controls a gate potential of the FET.

5. The semiconductor light source driving apparatus according to claim 4, wherein a series circuit of a zener diode and a current limiting resistor is connected between a drain and a source of the FET.

6. The semiconductor light source driving apparatus according to claim 1, wherein the light source unit includes a first type of light source module and a second type of light source module,
   the first type of light source module includes a p-channel FET, a series circuit connected between a drain and a source of the P-channel FET, including one or more series-connected light source elements, and a resistor connected between a gate and the source of the P-channel FET,
   the second type of light source module includes a N-channel FET, a series circuit connected between a drain and a source of the N-channel FET, including one or more series-connected light source elements, and a resistor connected between a gate and the source of the N-channel FET, and
   the control signal is supplied to the gates of the P-channel FET and the N-channel FET.

7. The semiconductor light source driving apparatus according to claim 1, further comprising an informing unit configured to inform a user of occurrence of the disconnection failure and/or the light source module having the disconnection failure.

8. A projection type display apparatus comprising:
   the semiconductor light source driving apparatus according to claim 1;
   a light modulation device for modulating a light based on a light output from the semiconductor light source driving apparatus according to a video signal to generate an image light; and
   a projection lens for projecting the image light onto a screen.

* * * * *